3,408,370
3-HYDROXY AND 3-MONOACYLATED STEROIDS AND THE 6- AND 16-SUBSTITUTED ANALOGUES THEREOF
John C. Babcock and J. Allan Campbell, Kalamazoo, Mich., assignors to The Upjohn Company, Kalamazoo, Mich., a corporation of Delaware
No Drawing. Filed May 1, 1963, Ser. No. 277,090
The portion of the term of the patent subsequent to Sept. 28, 1982, has been disclaimed
8 Claims. (Cl. 260—397.4)

This invention relates to novel steroids and more particularly 3β-hydroxy steroids, the derivatives thereof, and methods used in the preparation thereof.

The novel compounds of this invention can be represented by the compounds of the formulae:

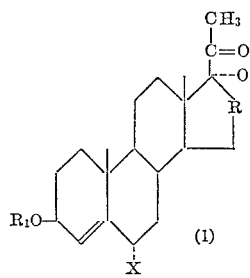 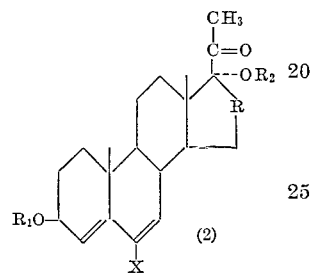

wherein X is selected from the group consisting of hydrogen, methyl fluoro, chloro, trifluoromethyl, difluoromethyl, and fluoromethyl; R is selected from the group consisting of

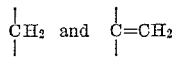

with the proviso that when X is fluoro, chloro, trifluoromethyl, difluoromethyl and fluoromethyl, R must be

$R_1$ is selected from the group consisting of hydrogen and the acyl radical of an organic carboxylic acid, preferably a hydrocarbon monocarboxylic acid containing from 1 to 12 carbon atoms inclusive; and $R_2$ is the acyl radical of an organic carboxylic acid, preferably the acyl radical of a hydrocarbon carboxylic acid containing from 1 to 12 carbon atoms, inclusive, e.g., the acetyl radical.

The novel compounds of this invention, the compounds of Formulae 1 and 2, are effective antifertility, estrus regulating, progestational, and pregnancy maintaining agents of improved therapeutic ratio and are particularly useful in the treatment of mammals. The compounds above are also useful in the treatment of inflammatory conditions of mammals and birds and are particularly useful in the treatment of inflammatory conditions of the skin, eyes and ears of valuable domestic animals, as well as contact dermatitis and other allergic reactions.

Administration of the novel steroids of this invention can be in conventional dosage forms, such as pills, tablets, capsules, syrups or elixirs for oral use, or in liquid forms which are adaptable to the natural and synthetic cortical hormones for injectable products; they can also be administered topically in the form of ointments, creams, lotions, and the like, with or without coating antibiotics, germicides or other materials forming advantageous combinations therewith.

In addition, the compounds of Formulae 1 and 2 possess the added property of being oil-soluble and can be administered intramuscularly and orally in the form of oil solutions.

The novel steroids of this invention are prepared according to the following flow-sheet:

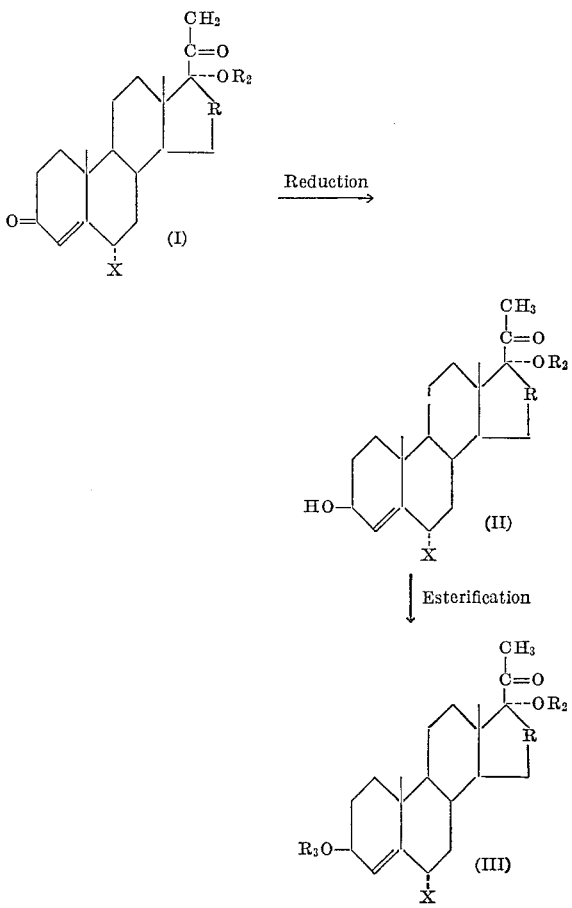

wherein X, R and $R_2$ are defined as above and $R_3$ is the acyl radical of an organic carboxylic acid, preferably a hydrocarbon monocarboxylic acid, containing from 1 to 12 carbon atoms, inclusive.

It is to be understood that the flow sheet (and the discussion thereof which follows) is not to be construed as being limited to the $\Delta^4$-steroids only but is applicable to, and embrasive of, the corresponding $\Delta^6$-steroids, that is, the $\Delta^4$-steroids having an additional bond at the 6(7)-position whereupon the 6-substituent, X, will be neither α nor β but will necessarily be in the plane of the B-ring.

The novel compounds of the present invention are prepared by the following reactions:

Reduction (I)→(II).

The compounds of Formula I, such as 17α-hydroxy-4-pregnene-3,20-dione 17-acetate, are reduced with a metal hydride reducing agent, such as lithium aluminum tri-t-butoxyhydride, sodium borohydride, lithium borohydride, calcium borohydride and the like, in an inert solvent to obtain the compounds of Formula II, such as 3β-17α-dihydroxy-4-pregnen-20-one 17-acetate.

The selective reduction of the 3-keto group of the $\Delta^4$-3,20-dione (or $\Delta^{4,6}$-3,20-dione) to yield the corresponding 3β-hydroxy-$\Delta^4$-20-one (or 3β-hydroxy-$\Delta^{4,6}$-20-one) is quite surprising since ordinarily either the 20-keto group is selectively reduced in the presence of a conjugated 3-keto group [J. K. Norymberski and G. R. Woods, J. Chem. Soc. 3426 (1955) and Tetrahedron 3, 144 (1958)] or mixtures requiring chromatography, digitonide separation and extensive purification are produced [D. Kepler, Tetrahedron 15, 193 (1961)].

Suitable inert solvents are tetrahydrofuran, ether, dioxane, ethylene glycol dimethyl ether, methanol, isopropanol, and the like, tetrahydrofuran being preferred for the mixed lithium hydrides and methanol being preferred for sodium borohydride. The reaction is usually carried out at temperatures from about −5° to 40° C., although temperatures of from about −15° to 100° C. are operative. Completion of the reaction can take from ¼ hour to several days, depending in part on the temperature employed, the selected solvent, and the reducing agent.

The thus obtained compounds of Formula II are recovered from the reaction mixture and purified by conventional methods such as, for example, decomposition of excess hydride with dilute acid, dilution of the reaction mixture and collection of the thus produced reduction product by filtration or extraction with a water-immiscible solvent, such as methylene chloride, ethyl acetate, benzene, ether, and the like, direct crystallization, chromatography, counter-current extraction, or a combination of these, followed by final recrystallization if desired.

Esterification with hydrocarbon monocarboxylic acids (II)→(III).

The compounds of Formula II can be converted to their 3β-acylates, the compounds of Formula III, by methods known in the art. This is accomplished by allowing the compounds of Formula II, such as 3β,17β-dihydroxy-4-pregnen-20-one 17-acetate, to react with an acylating agent thus yielding the compounds of Formula III, such as 3β,17β-dihydroxy-4-pregnen-20-one 3-acylate 17-acetate.

Suitable acylating agents are monobasic organic carboxylic acids, particularly hydrocarbon carboxylic acids, containing from 1 to 12 carbon atoms, inclusive, or the anhydrides or acid halides thereof. For example, a saturated straight-chain aliphatic acid, e.g., formic, acetic, propionic, butyric, caproic, valeric, hexanoic, heptanoic, octanoic, undecanoic, and the like; a saturated branched-chain aliphatic acid, e.g., trimethylacetic, diethylacetic, isobutyric, isovaleric, tertiary butylacetic, and the like; a cycloaliphatic saturated acid, e.g., β-cyclopentylpropionic, cyclohexane-carboxylic, cyclohexylacetic, and the like; an alkaryl acid, e.g., benzoic, phenylacetic, β-phenylpropionic, o-, m-, p-toluic, and the like, a monobasic unsaturated acid, e.g., acrylic, crotonic, undecylenic, propiolic, undecolic, cinnamic and the like or the acid anhydrides and acid halides thereof can be used to acylate the compounds of Formula II to convert them into the compounds of Formula III.

The conversion of the compounds of Formula II to the compounds of Formula III is carried out using the acylating agent as solvent, or preferably in the presence of a suitable inert solvent, such as benzene, xylene, dioxane, methylene chloride, ether, and the like, particularly when the acylating agent is a solid, and frequently in the presence of a catalyst, such as p-toluenesulfonic acid, or an amine, preferably pyridine. Completion of the reaction can take from a few minutes to 24 hours, depending on the temperature and the solvent employed. If the acylating agent is the free acid, the reaction is preferably carried out in the presence of an esterification catalyst, for example, p-toluenesulfonyl chloride, trifluoroacetic anhydride, p-toluenesulfonic acid, trifluoroacetic acid, sulfuric acid, and the like.

The thus obtained compounds of Formula III are recovered from the reaction mixture by conventional methods, such as, for example, precipitation by dilution with water or extraction and washing followed if desired by conventional methods such as those described above for the recovery and purification of compounds of Formula II.

The following preparations and examples illustrate the best mode contemplated by the inventors for carrying out their invention, but are not to be construed as limiting the scope thereof.

*Preparation 1.—6α-difluoromethyl-17α-hydroxy-4-pregnene-3,20-dione 17-acetate*

A.—6α-HYDROXYMETHYL-3β,17α-DIHYDROXY-5α-PREGNAN-20-ONE 3,17-DIACETATE

A mixture of 125 g. of the known compound 3β,17α-dihydroxy-5-pregnen-20-one 3,17-diacetate, 1875 ml. of toluene and 18.75 g. of cobalt carbonate catalyst was placed in a 1 gallon stainless steel autoclave equipped with a mechanical stirrer. The vessel was flushed three times with carbon monoxide and the pressure therein brought to 450 p.s.i. with carbon monoxide, then to 1150 p.s.i., with hydrogen and heated at 180° C. for a period of about 18 hours. The reaction mixture was cooled and filtered through a bed of Celite (diatomaceous earth) and the clear yellow filtrate concentrated to dryness on a rotary evaporator. The residue was triturated with a mixture of ethyl acetate and ether and the crystals collected and washed with ether to yield 71.2 g. of product with a melting point of 225 to 231° C. An additional 4.6 g. was obtained from the mother liquor. A portion of the product was recrystallized from ethyl acetate to yield an analytical sample of 6α-hydroxymethyl-3β,17α-dihydroxy-5α-pregnan-20-one 3,17-diacetate having a melting point of 232 to 234° C. and a rotation $[\alpha]_D$ of −1° (chloroform).

*Analysis.*—Calcd. for $C_{16}H_{40}O_6$: C, 69.01; H, 8.99. Found: C, 69.64; H, 8.72.

B.—6α-p-TOLUENESULFONOXYMETHYL-3β,17α-DIHYDROXY-5α-PREGNAN-20-ONE 3,17-DIACETATE 14.3 g. of p-toluenesulfonyl chloride was added to a solution of 14.3 g. of 6α - hydroxymethyl - 3β,17α - dihydroxy-5α-pregnan-20-one 3,17-diacetate in 100 ml. of pyridine. The solution was kept in a cold bath for a few minutes, then at room temperature for a period of about 18 hours. The solution was then poured into dilute sodium bicarbonate solution and the resulting precipiate collected on a filter, thoroughly washed with water and dried to yield 17.8 g. of product having a melting point of 197 to 208° C. Two recrystallizations from ethyl acetate gave an analytical sample of 6α-p-toluenesulfonoxymethyl - 3β,-17α-dihydroxy-5α-pregnan-20-one 3,17-diacetate, melting at 214 to 216° C. with rotation $[\alpha]_D$ (chloroform) of +1°.

*Analysis.*—Calcd. for $C_{32}H_{44}O_8S$: C, 65.28; H, 7.53; S, 5.45. Found: C, 65.82; H, 7.82; S, 5.23.

C.—6α-FORMYL-3β,17α-DIHYDROXY-5α-PREGNAN-20-ONE 3,17-DIACETATE

A suspension of 20 g. of sodium bicarbonate in 125 ml. of dimethylsulfoxide with nitrogen bubbling therethrough was heated in an oil bath held at a temperature of about 155° C. When the temperature of the suspension reached 135° C., 12.3 g. of 6α-p-toluenesulfonoxymethyl-3β,17α - dihydroxy - 5α - pregnan-20-one 3,17-diacetate was added thereto. The flask containing the suspension was swirled intermittently for a period of about 10 minutes. The reaction mixture was cooled to about 40° C., then poured into ice-water. The amorphous precipitate was collected, washed with water and dried to yield 9.05 g. of product. A 1 g. aliquot of this material was chromatographed through a 100 g. Florisil (synthetic magnesium silicate) column using gradient elution, employing 3 l. of a mixture of Skellysolve B (hexane hydrocarbons) containing 4% acetone and 3 l. of a mixture of Skellysolve B containing 12% of acetone and collecting 250 ml. fractions to yield the desired aldehyde (fractions 13 to 17). The product obtained from these eluates was recrystallized twice from ether to give 0.2 g. of dense crystals of 6α-formyl - 3β,17α - dihydroxy-5α-pregnan-20-one 3,17-diacetate with a melting point of 170 to 172° C. (decomposition) and rotation $[\alpha]_D$ (chloroform) of +28°.

*Analysis.*—Calcd. for $C_{26}H_{38}O_6$: C, 69.92; H, 8.58. Found: C, 70.01; H, 8.70.

D.—6α-DIFLUOROMETHYL-3β,17α-DIHYDROXY-5α PREGNAN-20-ONE 3,17-DIACETATE 2 g. of unpurified 6α-formyl-3β,17α-dihydroxy-5α-pregnan-20-one 3,17-diacetate in 20 ml. of methylene chloride and 0.2 ml. of water was treated with 40 g. of sulfur tetrafluoride in a stainless steel rocking autoclave at room temperature for a period of about 16 hours. The reaction mixture was washed with sodium bicarbonate solution and water, dried and the solvent removed. The residue was dissolved in methylene chloride and chromatographed through a 175 g. Florisil column packed wet with Skellysolve B and eluted by gradient elution with 4 l. of a mixture of 3% acetone in Skellysolve B and 4 l. of a mixture of 12% acetone in Skellysolve B taking 250 ml. fractions. The desired difluoromethyl compound was eluted in fractions 14 to 21. The residues of these fractions were combined and recrystallized from a mixture of acetone and Skellysolve B to yield 1.15 g. of this material. Recrystallization from the same solvents gave pure light-colored 6α-difluoromethyl-3β,17α-dihydroxy-5α-pregnan-20-one 3,17-diacetate melting at 154 to 156° C.

*Analysis.*—Calcd. for $C_{26}H_{38}F_2O_5$: C, 66.64; H, 8.17. Found: C, 67.04; H, 8.17.

E.—6α-DIFLUOROMETHYL-3β,17α-DIHYDROXY-5α-PREGNAN-20-ONE 17-ACETATE

A solution of 1.9 g. of 6α-difluoromethyl-3β,17α-dihydroxy-5α-pregnan-20-one 3,17-diacetate was heated at refluxing temperature with 40 ml. of methanol and 0.4 ml. of concentrated hydrochloric acid for a period of about 1 hour. Water was added and most of the methanol evaporated with a fast stream of nitrogen. The resulting precipitate was collected by filtration, washed with water and dried to yield 1.6 g. of product. A small amount of this material was recrystallized from a mixture of acetone and Skellysolve B to yield 6α-difluoromethyl-3β,17α-dihydroxy-5α-pregnan-20-one 17-acetate with a melting point of 197 to 205° C. and a rotation $[\alpha]_D$ (chloroform) of +12°.

*Analysis.*—Calcd. for $C_{24}H_{36}F_2O_4$: C, 67.57; H, 8.51. Found: C, 67.54; H, 8.61.

F.—6α-DIFLUOROMETHYL-17α-HYDROXY-5α-PREGNANE-3,20-DIONE 17-ACETATE 0.9 g. of 6α-difluoromethyl-3β,17α-dihydroxy-5α-pregnan-20-one 17-acetate was added to a solution of 0.9 g. of sodium dichromate dihydrate in 9 ml. of acetic acid. The solution was stirred for a period of about 5 hours and poured into water. The resulting precipitate was collected by filtration, washed with water and dried. It was chromatographed through a 75 g. column of Florisil previously packed wet with Skellysolve B; gradient elution of the product was carried out with mixtures of 3 l. of 2% acetone in Skellysolve B and 3 l. of 12% acetone in Skellysolve B taking 250 ml. fractions. Fractions 22 to 27 gave 0.6 g. of the 3-ketone melting at 188 to 192° C. after recrystallization from acetone. A small portion of this material was again recrystallized from acetone to yield pure light-colored 6α-difluoromethyl-17α-hydroxy-5α-pregnane-3,20-dione 17-acetate having a melting point of 192 to 193° C. and a rotation $[\alpha]_D$ (chloroform) of +17°.

*Analysis.*—Calcd. for $C_{24}H_{34}F_2O_4$: C, 67.90; H, 8.07. Found: C, 68.10; H, 8.34.

G.—6α-DIFLUOROMETHYL-17α-HYDROXY-4-PREGNENE-3,20-DIONE 17-ACETATE 410 mg. of 6α-difluoromethyl-17α-hydroxy-5α-pregnane-3,20-dione 17-acetate in 10 ml. of dioxane was acidified with a drop of 4 N hydrogen bromide in dioxane and 320 mg. of bromine added over a period of 1 minute. After a period of about 1 hour at room temperature, an excess of aqueous sodium bicarbonate solution was added to the reaction mixture. The precipitated 2,4-dibromo derivative of 6α-difluoromethyl-17α-hydroxy-5α-pregnan-3,20-dione 17-acetate was treated with 0.9 g. of sodium iodide in 15 ml. of acetone containing bromoacetone, and the mixture heated at refluxing temperature for a period of about 2.5 hours. 0.3 g. of oxalic acid was then added and heating continued for a period of about 1 hour. After cooling, ethyl acetate was added and the solution filtered. The filtrate was washed with water and sodium bicarbonate solution, then dried with sodium sulfate. The filtrate was stirred with 500 mg. of zinc dust in 2 ml. of acetic acid for about 1 hour and then filtered. The organic layer was washed successively with water, sodium bicarbonate solution and dried with sodium sulfate. Evaporation of the solvent gave the crude α,β-unsaturated ketone, which on purification with a Girard reagent, followed by subsequent crystallization yielded pure light-colored 6α - difluoromethyl-17α-hydroxy-4-pregnene-3,20-dione 17-acetate.

Alternatively, if desired, the crude α,β-unsaturated ketone can be purified by chromatography over Florisil with increasing proportions of acetone in Skellysolve B, followed by recrystallization.

H.—6α-DIFLUOROMETHYL-17α-HYDROXY-4-PREGNENE-3,20-DIONE 17-ACETATE

A medium consisting of 1% dextrose hydrate, 2% cornsteep liquor of 60% solids and tap water was adjusted to pH 4.9 with sodium hydroxide. The medium was steam sterilized at 15 pounds pressure for about 30 minutes, cooled and then inoculated with a 24 hour growth, from spores, of *Nocardia blackwellii* (NCTC 630 [Medical Research Council of the Lister Institute, London]). The medium was agitated and sparged with sterile air at the rate of one-tenth volume of air per volume of medium per minute. At the end of 24 hours of fermentation at room temperature, the pH was about 7.4. To this culture there was added a solution of 6α-difluoromethyl-17α-hydroxy-5α-pregnane-3,20-dione 17-acetate dissolved in a minimal amount of dimethylformamide. The solution was prepared by dissolving 5 parts of the steroid in 100 parts of the solvent and adding about 10 ml. of the solution per liter of the medium. Fermentation was continued for a period of about 6 hours whereupon the mycelium and beer were extracted thoroughly with methylene chloride. The extract was washed with sodium bicarbonate solution and then with water, dried and concentrated under vacuum to give 6α-difluoromethyl-17α-hydroxy-4-pregnene-3,20-dione.

Instead of *Nocardia blackwellii* (NCTC 630 [Medical Research Council of the Lister Institute, London]) to produce fermentative dehydrogenation at the 4, 5 position, other microorganisms may be similarly effectively employed; included are those chosen from the group consisting of: ATCC 4275 (*Nocardia convoluta*); ATCC 9604 (*Nocardia gardneri* and NRRL B-1365 (*Nocardia coeliaca*).

A solution composed of 1 g. of 6α-difluoromethyl-17α-hydroxy-4-pregnene-3,20-dione, 2.5 ml. of distilled acetic hydride, 250 mg. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6α-difluoromethyl-17α-hydroxy-4-pregnene-3,20-dione 17-acetate.

Substituting another lower hydrocarbon carboxylic acid anhydride for the acetic anhydride and extending the reaction time is productive of other 6α-difluoromethyl-17α-hydroxy-4-pregnene-3,20-dione 17-acylates wherein the acyl radical of the acylate group is the acyl radical of, for example, a saturated straight-chain aliphatic acid, e.g., formic, acetic, propionic, butyric, caproic, valeric, hexanoic, heptanoic, octanoic, undecanoic, and the like; a saturated branched-chain aliphatic acid, e.g., trimethylacetic, diethylacetic, isobutyric, isovaleric, tertiary butylacetic, and the like; a cycloaliphatic saturated acid, e.g., β - cyclopentylpropionic, cyclohexane-carboxylic, cyclohexylacetic, and the like; an alkaryl acid, e.g., benzoic, phenylacetic, β-phenylpropionic, o-, m-, p-toluic, and the like; a monobasic unsaturated acid, e.g., acrylic, crotonic, undecylenic, propiolic, undecolic, cinnamic, and the like.

*Preparation 2.—6-difluoromethyl-17α-hydroxy-4,6-pregnadiene-3,20-dione 17-acetate*

1 g. of 6α-difluoromethyl-17α-hydroxy-4-pregnene-3,20-dione 17-acetate, 1.5 g. of recrystallized 2,3,5,6-tetrachloro-1,2-benzoquinone (chloranil) and 60 ml. of tertiary amyl alcohol were heated to boiling under nitrogen with a few boiling chips and, gently refluxed for a period of about 6 hours. The mixture was cooled and evaporated to dryness under reduced pressure. The solid residue (with the exception of some chloranil, which was insoluble) was dissolved in about 100 ml. of ether and filtered. The chloranil on the filter paper was washed with several portions of ether and the combined ether filtrates washed with 200 ml. portions of cold 2% sodium hydroxide. The ether filtrates were washed with cold water until the washings were neutral, then with saturated sodium chloride solution. The pooled ether solutions were dried over sodium sulfate and evaporated to dryness. This residue dissolved in methylene chloride was chromatographed over a 125 g. column of Florisil and eluted with fractions of Skellysolve B containing increasing proportions of acetone. The last third of the fractions were evaporated to dryness. The residue was recrystallized twice from cold methanol to yield pure light colored crystalline 6-difluoromethyl-17α-hydroxy-4,6-pregnadiene-3,20-dione 17-acetate.

In the same manner as the foregoing preparation, substitution of other 17-acylates of 6α-difluoromethyl-17α-hydroxy-4-pregnene-3,20-dione, disclosed in Preparation 1H, as the starting steroid is productive of the corresponding 6-difluoromethyl-17α - hydroxy-4,6-pregnadiene-3,20-dione and 17-acylate.

*Preparation 3.—6α-fluoromethyl-17α-hydroxy-4-pregnene-3,20-dione 17-acetate*

A.—6α-IODOMETHYL-3β,17α-DIHYDROXY-5α-PREGNAN-20-ONE 3,17-DIACETATE

A suspension of 15 g. of 6α-hydroxymethyl-3β,17α-dihydroxy-5α-pregnan-20-one 3,17-diacetate (see Preparation 1A) and 20 g. of triphenylphosphite methiodide in 30 ml. of methyl iodide was heated at refluxing temperature for a period of about 2 hours or about one hour longer and the formation of a clear solution. Most of the solvent was evaporated leaving a dark syrup. The syrup was diluted with a mixture of methylene chloride and ether and washed successively with water, dilute sodium thiosulfate, additional water and dried. The solvent was removed with a rotary evaporator to give a light-colored oil. Addition of methanol to the oil precipitated the product which was collected on a filter, washed with a small amount of methanol and dried to yield 12.3 g. of material melting at 202 to 204° C. An analytical sample was obtained by recrystallization of the product from a mixture of acetone and Skellysolve B (hexanes) to yield 6α-iodomethyl-3β,17α-dihydroxy-5α-pregnan-20-one 3,17-diacetate with a melting point of 201 to 205° C. and a rotation $[\alpha]_D$ of +28° (chloroform).

*Analysis.*—Calcd. for $C_{26}H_{39}O_5I$: C, 55.91; H, 7.04; I, 22.72. Found: C, 56.37; H, 7.04; I, 20.64.

B.—6α-FLUOROMETHYL-3β,17α-DIHYDROXY-5α-PREGNAN-20-ONE 3,17-DIACETATE

A solution of silver fluoride was prepared in a polyethylene bottle by condensing 26 g. of hydrogen fluoride, adding 200 ml. of acetonitrile and then adding an excess of silver oxide, filtering off the unreacted silver oxide and recovering the clear silver fluoride solution. 190 ml. of the thus prepared silver fluoride solution mixed with 12 g. of 6α-iodomethyl-3β,17α-dihydroxy-5α-pregnan-20-one 3,17-diacetate was stirred at room temperature for a period of about one-half hour and then heated at refluxing temperature for a period of about 2 hours. Most of the solvent was evaporated off with a stream of nitrogen. The remaining concentrated material was diluted with water and extracted thoroughly with methylene chloride. The extracts were pooled, washed with water, dried and concentrated to dryness to give a crude partly crystalline product containing 6α-fluoromethyl-3β,17α-dihydroxy-5α-pregnan-20-one 3,17-diacetate which can, if desired, be separated by conventional means e.g., by chromatography and crystallization.

C.—6α-FLUOROMETHYL-3β,17α-DIHYDROXY-5α-PREGNAN-20-ONE 17-ACETATE

About 9 g. of the crude partly crystalline product containing 6α-fluoromethyl-3β,17α-dihydroxy-5α-pregnan-20-one 3,17-diacetate (obtained in Preparation 3B) was dissolved in 200 ml. of methanol and 2 ml. of concentrated hydrochloric acid and refluxed for a period of about an hour under a stream of nitrogen. Part of the methanol was evaporated with nitrogen, and water added to cause precipitation. The precipitate was separated by filtration, washed with water and dried to yield 8 g. of a crude product containing 6α-fluoromethyl - 3β,17α-dihydroxy-5α-pregnan-20-one 17-acetate which can, if desired, be purified by conventional means, e.g., by chromatography and crystallization.

D.—6α-FLUOROMETHYL-17α-HYDROXY-5α-PREGNANE-3,20-DIONE 17-ACETATE 8 g. of the crude product containing 6α-fluoromethyl-3β,17α-dihydroxy-5α-pregnan-20-one 17-acetate (obtained in Preparation 3C) was added to a solution of 8 g. of sodium dichromate dihydrate in 70 ml. of acetic acid. After a period of about 5½ hours, the reaction mixture was poured into water and the resulting precipitate filtered, washed with water and sucked nearly dry. The precipitate was dissolved in methylene chloride and the organic phase separated and dried over magnesium sulfate. The methylene chloride solution was adsorbed on a column of 300 g. of Florisil (synthetic magnesium silicate) and the column extracted by gradient elution chromatography employing 4 l. of 4% acetone in Skellysolve B and 4 l. of 10% acetone in Skellysolve B.

6α - fluoromethyl - 17α - hydroxy-5α-pregnane-3,20-dione 17-acetate was eluted in fractions 23 to 29. These fractions were pooled and evaporated; the combined residues on recrystallization gave 2 g. of product with a melting point of 172 to 175° C. An analytical sample was obtained by recrystallization from a mixture of acetone and Skellysolve B, providing pure 6α-fluoromethyl-17α-hydroxy-5α-pregnane-3,20-dione 17-acetate with a melting point of 175 to 176° C.

*Analysis.*—Calcd. for $C_{24}H_{35}FO_4$: C, 70.90; H, 8.68; F, 4.67. Found: C, 71.08; H, 8.88; F, 4.59.

E.—6α-FLUOROMETHYL-17α-HYDROXY-4-PREGNENE-3,20-DIONE 17-ACETATE 410 mg. of 6α-fluoromethyl-17α-hydroxy-5α-pregnane-3,20-dione 17-acetate in 10 ml. of dioxane was acidified with a drop of 4 N hydrogen bromide in dioxane and 320 mg. of bromine added over a period of 1 minute. After a period of about 1 hour at room temperature, an excess of sodium bicarbonate solution was added to the reaction mixture. The precipitated 2,4-dibromo derivative of 6α-fluoromethyl-17α-hydroxy-5α-pregnan-3,20-dione 17- acetate was treated with 0.9 g. of sodium iodide in 15 ml. of acetone containing bromoacetone, and the mixture heated at refluxing temperature for a period of about 2.5 hours. 0.3 g. of oxalic acid was then added and heating continued for a period of about 1 hour. After cooling, ethyl acetate was added and the solution filtered. The filtrate was washed with water and sodium bicarbonate solution, then dried with sodium sulfate. The filtrate was stirred with 500 mg. of zinc dust in 2 ml. of acetic acid for about 1 hour and then filtered. The organic layer was washed successively with water, sodium bicarbonate solution and dried with sodium sulfate. Evaporation of the solvent gave the crude α,β-unsaturated ketone, which on purification with a Girard reagent, followed by subsequent crystallization yielded pure light colored 6α-fluoromethyl-17α-hydroxy-4-pregnene-3,20-dione 17-acetate. Alternatively, if desired, the crude α,β-unsaturated ketone can be purified by chromatography over Florisil with increasing proportions of acetone in Skellysolve B, followed by recrystallization.

F.—6α-FLUOROMETHYL-17α-HYDROXY-4-PREGNENE-3,20-DIONE 17-ACETATE

A medium consisting of 1% dextrose hydrate, 2% cornsteep liquor of 60% solids and tap water was adjusted to pH 4.9 with sodium hydroxide. The medium was steam sterilized at 15 pounds pressure for about 30 minutes, cooled and then inoculated with a 24 hour growth, from spores, of *Nocardia blackwellii* (NCTC 630 [Medical Research Council of the Lister Institute, London]). The medium was agitated and sparged with sterile air at the rate of one-tenth volume of air per volume of medium per minute. At the end of 24 hours of fermentation at room temperature, the pH was about 7.4. To this culture, there was added a solution of 6α-fluoromethyl-17α-hydroxy-5α-pregnane-3,20-dione 17-acetate dissolved in a minimal amount of dimethylformamide. The solution was prepared by dissolving 5 parts of the steroid in 100 parts of the solvent and adding about 10 ml. of the solution per liter of the medium. Fermentation was continued for a period of about 6 hours whereupon the mycelium and beer were extracted thoroughly with methylene chloride. The extract was washed with sodium bicarbonate solution and then with water, dried and concentrated under vacuum to give 6α-fluoromethyl-17α-hydroxy-4-pregnene-3,20-dione.

Instead of *Nocardia blackwellii* (NCTC 630 [Medical Research Council of the Lister Institute, London]) used to produce fermentative dehydrogenation at the 4,5-position, other microorganisms may be similarly effectively employed; included are those chosen from the group consisting of: ATCC 4275 (*Nocardia convoluta*); ATCC 9604 (*Nocardia gardneri*) and NRRL B–1365 (*Nocardia coeliaca*).

A solution composed of 1 g. of 6α-fluoromethyl-17α-hydroxy-4-pregnene-3,20-dione 17-acetate, 2.5 ml. of distilled acetic anhydride, 250 mg. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6α-fluoromethyl-17α-hydroxy-4-pregnene-3,20-dione 17-acetate.

Substituting another lower-hydrocarbon carboxylic acid anhydride, for the acetic anhydride is productive of other 6α - fluoromethyl-17α-hydroxy-4-pregnene-3,20-dione 17-acylates wherein the acyl radical of the acylate group is the acyl radical of, for example, a saturated straight-chain aliphatic acid, e.g., formic, acetic, propionic, butyric, caproic, valeric, hexanoic, heptanoic, octanoic, undecanoic, and the like; a saturated branched-chain aliphatic acid, e.g., trimethylacetic, diethylacetic, isobutyric, isovaleric, tertiary butylacetic, and the like; a cycloaliphatic saturated acid, e.g., β-cyclopentylpropionic, cyclohexanecarboxylic, cyclohexylacetic, and the like; an alkaryl acid, e.g., benzoic, phenylacetic, β-phenylpropionic, o- m-, p-toluic, and the like; a monobasic unsaturated acid, e.g., acrylic, crotonic, undecylenic, propiolic, undecolic, cinnamic, and the like.

*Preparation 4.—6-fluoromethyl-17α-hydroxy-4,6-pregnadiene-3,20-dione 17-acetate*

1 g. of 6α-fluoromethyl-17α-hydroxy-4-pregnene-3,20-dione 17-acetate, 1.5 g. of recrystallized 2,3,5,6-tetrachloro-1,4-benzoquinone (chloranil) and 60 ml. of tertiary amyl alcohol were heated to boiling under nitrogen with a few boiling chips, and gently refluxed for a period of about 6 hours. The mixture was cooled and evaporated to dryness under reduced pressure. The solid residue (with the exception of some chloranil, which was insoluble) was dissolved in about 100 ml. of ether and filtered. The chloranil on the filter paper was washed with several portions of ether and the combined ether filtrates washed with 200 ml. portions of cold 2% sodium hydroxide. The ether filtrates were washed with cold water until the washings were neutral, then with saturated sodium chloride solution. The pooled ether solutions were dried over sodium sulfate and evaporated to dryness. The residue crystallized readily from cold acetone to yield pure light-colored crystalline 6-fluoromethyl-17α-hydroxy-4,6-pregnadiene-3,20-dione 17-acetate.

In the same manner as in the foregoing preparation, substitution of other 17-acylates of 6α-fluoromethyl-17α-hydroxy-4-pregnene-3,20-dione, disclosed in Preparation 3F, as the starting steroid is productive of the corresponding 6 - fluoromethyl - 17α - hydroxy-4,6-pregnadiene-3,20-dione 17-acylates.

*Preparation 5. — 6-fluoro-17 -hydroxy-4,6-pregnadiene-3,20-dione 17-propionate*

A.—6-FLUORO-17α-HYDROXY-4,6-PREGNADIENE-3,20-DIONE

A solution of 6-fluoro-17α-acetoxy-4,6-pregnadiene-3,20-dione in methanol is treated with a slight excess of 10% aqueous sodium hydroxide solution. The mixture is stirred and allowed to stand at room temperature until hydrolysis is essentially complete. The reaction mixture is then neutralized with dilute acetic acid and evaporated at reduced pressure to remove the methanol. The aqueous residue thus obtained is then extracted with methylene chloride. The methylene chloride extracts are combined, washed with water, dried over anhydrous sodium sulfate and evaporated to give 6-fluoro-17α-hydroxy-4,6-pregnadiene-3,20-dione which can be further purified by recrystallization from acetone-Skellysolve B.

In the same manner, substituting for 6-fluoro-17α-acetoxy-4,6-pregnadiene-3,20-dione as starting material:

6α-chloro-17α-acetoxy-4-pregnene-3,20-dione,
6-chloro-17α-acetoxy-4,6-pregnadiene-3,20-dione,
6α-trifluoromethyl-17α-acetoxy-4-pregnene-3,20-dione,
6-trifluoromethyl-17α-acetoxy-4,6-pregnadiene-3,20-dione,
16-methylene-17α-acetoxy-4-pregnene-3,20-dione,
16-methylene-17α-acetoxy-4,6-pregnadiene-3,20-dione,
16-methylene-6α-methyl-17α-acetoxy-4-pregnene-3,20-dione,
16-methylene-6-methyl-17α-acetoxy-4,6-pregnadiene-3,20-dione, and
17α-acetoxy-4,6-pregnadiene-3,20-dione is productive of
6α-chloro-17α-hydroxy-4-pregnene-3,20-dione,
6-chloro-17α-hydroxy-4,6-pregnadiene-3,20-dione,
6α-trifluoromethyl-17α-hydroxy-4-pregnene-3,20-dione,
6-trifluoromethyl-17α-hydroxy-4,6-pregnadiene-3,20-dione,
16-methylene-17α-hydroxy-4-pregnene-3,20-dione,
16-methylene-17α-hydroxy-4,6-pregnadiene-3,20-dione,
16-methylene-6α-methyl-17α-hydroxy-4-pregnene-3,20-dione,
16-methylene-6-methyl-17α-hydroxy-4,6-pregnadiene-3,20-dione, and
17α-hydroxy-4,6-pregnadiene-3,20-dione, respectively.

B.—6-FLUORO-17α-HYDROXY-4,6-PREGNADIENE-3,20-DIONE 17-PROPIONATE

A mixture of 2.0 g. of 6-fluoro-17α-hydroxy-4,6-pregnadiene-3,20-dione, 5 ml. of distilled propionic anhydride, 500 mg. of p-toluenesulfonic acid and 5 ml. of propionic acid is heated at 75° C. under a stream of nitrogen for a few minutes. The heat is then removed and the mixture is stirred for about 30 minutes. The mixture is then poured with vigorous stirring into 500 ml. of water. The precipitated solid is separated by filtration and dried to give 6-fluoro-17α-hydroxy-4,6-pregnadiene-3,20-dione 17- propionate, which can be further purified by recrystallization from an organic solvent such as acetone-Skellysolve B, ethyl acetate, methanol and the like.

In the same manner, substituting another hydrocarbon carboxylic acid anhydride for acetic anhydride is productive of the corresponding 6-fluoro-17α-hydroxy-4,6-pregnadiene-3,20-dione 17-acylate wherein the acyl radical is, for example, that of one of the acids previously listed.

In the same manner, substituting for 6-fluoro-17α-hydroxy-4,6-pregnadiene-3,20 dione as starting material:

6α-chloro-17α-hydroxy-4-pregnene-3,20-dione,
6-chloro-17α-hydroxy-4,6-pregnadiene-3,20-dione,
6α-trifluoromethyl-17α-hydroxy-4-pregnene-3,20-dione,
6-trifluoromethyl-17α-hydroxy-4,6-pregnadiene-3,20-dione,
16-methylene-17α-hydroxy-4-pregnene-3,20-dione,
16-methylene-17α-hydroxy-4,6-pregnadiene-3,20-dione,
16-methylene-6α-methyl-17α-hydroxy-4-pregnene-3,20-dione,
16-methylene-6-methyl-17α-hydroxy-4,6-pregnadiene-3,20-dione, and
17α-hydroxy-4,6-pregnadiene-3,20-dione, is productive of the corresponding 17-propionate and other 17-acylates wherein the acyl radical is, for example, that of one of the hydrocarbon carboxylic acids previously listed.

EXAMPLE 1

*3β,17α-dihydroxy-4-pregnen-20-one 17-acetate (II)*

To a solution of 10 g. of 17α-hydroxy-4-pregnene-3,20-dione 17-acetate in 250 ml. of purified tetrahydrofuran, cooled to between 5° C. to −15° C., there is added in small portions and with stirring 20 g. of lithium aluminum tri-t-butoxyhydride. The reaction mixture is allowed to gradually come to room temperature and the excess lithium aluminum tri-t-butoxyhydride is destroyed by the addition of dilute acid. The reaction mixture is washed with dilute hydrochloric acid, dried and chromatographed over a Florisil (synthetic magnesium silicate) column packed wet with commercial hexanes. The column is eluted with commercial hexanes containing increasing amounts of acetone and those fractions which by thin layer chromatography and ultraviolet absorption show the presence of the desired product are taken to dryness and recrystallized from mixtures of acetone-water and acetone-commercial hexanes to yield 3β,17α-dihydroxy-4-pregnen-20-one 17-acetate, a crystalline solid.

In like manner, substituting a stoichiometric equivalent amount of

6α-methyl-17α-hydroxy-4-pregnene-3,20-dione 17-acetate,
6α-fluoro-17α-hydroxy-4-pregnene-3,20-dione 17-acetate,
6α-chloro-17α-hydroxy-4-pregnene-3,20-dione 17-acetate,
6α-trifluoromethyl-17-hydroxy-4-pregnene-3,20-dione 17-acetate,
6α-difluoromethyl-17α-hydroxy-4-pregnene-3,20-dione 17-acetate,
6α-fluoromethyl-17α-hydroxy-4-pregnene-3,20-dione 17-acetate,
16-methylene-17α-hydroxy-4-pregnene-3,20-dione 17-acetate,
6α-methyl-16-methylene-17α-hydroxy-4-pregnene-3,20-dione 17-acetate,
17α-hydroxy-4,6-pregnadiene-3,20-dione 17-acetate,
6-methyl-17α-hydroxy-4,6-pregnadiene-3,20-dione 17-acetate,
6-fluoro-17α-hydroxy-4,6-pregnadiene-3,20-dione 17-acetate,
6-chloro-17α-hydroxy-4,6-pregnadiene-3,20-dione 17-acetate,
6-trifluoromethyl-17α-hydroxy-4,6-pregnadiene-3,20-dione 17-acetate,
6-difluoromethyl-17α-hydroxy-4,6-pregnadiene-3,20-dione 17-acetate,
6-fluoromethyl-17α-hydroxy-4,6-pregnadiene-3,20-dione 17-acetate,
16-methylene-17α-hydroxy-4,6-pregnadiene-3,20-dione 17-acetate, and
6-methyl-16-methylene-17α-hydroxy-4,6-pregnadiene-3,20-dione 17-acetate, for 17α-hydroxy-4-pregnene-3,20-dione 17-acetate is productive of 3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one 17-acetate,
3β,17α-dihydroxy-6α-trifluoromethyl-4-pregnen-20-one 17-acetate,
3β,17α-dihydroxy-6α-difluoromethyl-4-pregnen-20-one 17-acetate,
3β,17α-dihydroxy-6α-fluoromethyl-4-pregnen-20-one 17-acetate,
3β,17α-dihydroxy-16-methylene-4-pregnen-20-one 17-acetate,
3β,17α-dihydroxy-6α-methyl-16-methylene-4-pregnen-20-one 17-acetate,
3β,17α-dihydroxy-4,6-pregnadien-20-one 17-acetate,
3β,17α-dihydroxy-6-methyl-4,6-pregnadien-20-one 17-acetate,
3β,17α-dihydroxy-6-fluoro-4,6-pregnadien-20-one 17-acetate,
3β,17α-dihydroxy-6-chloro-4,6-pregnadien-20-one 17-acetate,
3β,17α-dihydroxy-6-trifluoromethyl-4,6-pregnadien-20-one 17-acetate,
3β,17α-dihydroxy-6-difluoromethyl-4,6-pregnadien-20-one 17-acetate,
3β,17α-dihydroxy-6-fluoromethyl-4,6-pregnadien-20-one 17-acetate,
3β,17α-dihydroxy-16-methylene-4,6-pregnadien-20-one 17-acetate, and
3β,17α-dihydroxy-6-methyl-16-methylene-4,6-pregnadien-20-one 17-acetate, respectively.

In the same manner as in the foregoing example, substituting for the starting 3-keto-17-hydroxysteroid 17-acetate another 17-acylate, for example one in which the acyl radical is that of one of the hydrocarbon carboxylic acids named above, is productive of the corresponding 3β,17α-dihydroxysteroid 17-acylate.

EXAMPLE 2

*3β,17α-dihydroxy-4-pregnen-20-one 3,17-diacetate (III)*

A solution is prepared containing 1 g. of 3β,17α-dihydroxy-4-pregnen-20-one 17-acetate in 10 ml. of pyridine and 1 g. of acetic anhydride. The solution is allowed to stand at room temperature for a period of about 24 hours, and is thereupon poured into ice water. The precipitated product is extracted into methylene chloride and washed with dilute acid, water, dried, and evaporated to give crystals of 3β,17α-dihydroxy-4-pregnen-20-one 3,17-diacetate which can be further purified by recrystallization from acetone-commercial hexanes.

Similarly, by allowing 3β,17α-dihydroxy-4-pregnen-20-one 17-acetate to react with the appropriate hydrocarbon carboxylic acid, or the acid anhydrides or acid halides thereof, there is produced the corresponding 3-acylates, such as, for example, the 3-formate, the 3-propionate, the 3-butyrate, the 3-caproate, the 3-valerate, the 3-hexanoate, the 3-heptanoate, the 3-octanoate, the 3-undecanoate, the 3-trimethylacetate, the 3-diethylacetate, the 3-isobutyrate, the 3-isovalerate, the 3-tertiary-butylacetate, the 3-(β-cyclopentylpropionate), the 3-cyclohexanecarboxylate, the 3-cyclohexylacetate, the 3-benzoate, the 3-phenylacetate, the 3-(β-phenylpropionate), the 3-(o-, m-, p-toluate), the 3-acrylate, the 3-crotonate, the 3-undecylenate, the 3-propiolate, the 3-undecolate, the 3-cinnamate, and the like, of 3β,17α-dihydroxy-4-pregnen-20-one 17-acetate.

In like manner, substituting a stoichiometric equivalent amount of the other 3β-hydroxysteroids which are obtained in Example 1 for 3β,17α-dihydroxy-4-pregnen-20-one 17-acetate and acylating with the appropriate acylating agent is productive of the 3-acylates, such as, for example, the 3-formate, the 3-acetate, the 3-propionate, the 3-butyrate, the 3-caproate, the 3-valerate, the hexanoate, the 3-heptanoate, the 3-octanoate, the 3-undecanoate, the 3-trimethylacetate, the 3-diethylacetate, the 3-isobutyrate, the 3-isovalerate, the 3-tertiarybutylacetate, the 3-(β-cyclopentylpropionate), the 3-cyclohexanecarboxylate, the 3-cyclohexylacetate, the 3-benzoate, the 3-phenylacetate, the 3-(β-phenylpropionate), the 3-(o-, m-, p-toluate), the 3-acrylate, the 3-crotonate, the 3-undecylenate, the 3-propiolate, the 3-undecolate, the 3-cinnamate, and the like, of 3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one 17-acetate,
3β,17α-dihydroxy-6α-trifluoromethyl-4-pregnen-20-one 17-acetate,
3β,17α-dihydroxy-6α-difluoromethyl-4-pregnen-20-one 17-acetate,
3β,17α-dihydroxy-6α-fluoromethyl-4-pregnen-20-one 17-acetate
3β,17α-dihydroxy-16-methylene-4-pregnen-20-one 17-acetate,
3β,17α-dihydroxy-6α-methyl-16-methylene-4-pregnen-20-one 17-acetate,
3β,17α-dihydroxy-4,6-pregnadien-20-one 17-acetate,
3β,17α-dihydroxy-6-methyl-4,6-pregnadien-20-one 17-acetate,
3β,17α-dihydroxy-6-fluoro-4,6-pregnadien-20-one 17-acetate,
3β,17α-dihydroxy-6-chloro-4,6-pregnadien-20-one 17-acetate,
3β,17α-dihydroxy-6-trifluoromethyl-4,6-pregnadien-20-one 17-acetate,
3β,17α-dihydroxy-6-difluoromethyl-4,6-pregnadien-20-one 17-acetate,
3β,17α-dihydroxy-6-fluoromethyl-4,6-pregnadien-20-one 17-acetate,
3β,17α-dihydroxy-16-methylene-4,6-pregnadien-20-one 17-acetate, and
3β,17α-dihydroxy-6-methyl-6-methylene-4,6-pregnadien-20-one 17-acetate, respectively.

In the above examples the esterifying agent is preferably the anhydride. However, when the esterifying agent is the free acid, the reaction is carried out in the presence of an esterification catalyst.

If the corresponding acylate agent is solid, an inert solvent such as toluene, methylene chloride dimethylformamide or dioxane can be added if desired to effect solution and to provide a liquid esterification medium.

Where the esterification reaction does not proceed to completion at room temperature, the temperature can be raised from room temperature to as high as 90° C. The course of the reaction is conveniently followed by thin layer chromatography on alumina or Florisil using disappearance of the 3-hydroxy starting material as the end-point. Hindered anhydrides of hydrocarbon carboxylic acids react more slowly than acetic anhydride and, if incomplete reaction at room temperature is observed after 24 hours, the temperature is raised, preferably to about 65° C., and the reaction permitted to proceed to completion.

In the same manner as in the foregoing example, substituting for the starting 3β,17α-dihydroxysteroid 17-acetate another 17-acylate, for example one in which the acyl radical is that of one of the hydrocarbon carboxylic acids given above, is productive of the corresponding 3β,17α-dihydroxysteroid 3,17-diacylate.

EXAMPLE 3

*3β,17α-dihydroxy-6α-methyl-4-pregnen-20-one 17-acetate (II)*

To a solution of 10 g. of 6α-methyl-17α-hydroxy-4-pregnen-3,20-dione 17-acetate in 250 ml. of purified tetrahydrofuran, cooled in an ice-salt bath, there was added in small portions and with stirring over about a ten minute period 20 g. of lithium aluminum tri-t-butoxyhydride. The reaction mixture was allowed to stand for ½ hour and following storage at −15° C. for 16 hours was allowed to come to room temperature where it was kept for 4 hours. The reaction mixture was cooled in an ice bath while dilute acetic acid was added thereto, followed by dilution with ether and successive washings with dilute hydrochloric acid saturated with salt, brine, dilute sodium bicarbonate, twice more with brine, and dried over magnesium sulfate. The solvent was removed and the residue chromatographed over a 300 g. Florisil (synthetic magnesium silicate) column packed wet with commercial hexanes. The chromatographic column was developed by eluting with commercial hexanes containing increasing amounts of acetone.

Recrystallization from acetone-water gave 6.0 g. of product melting at 185–193° C., which upon being recrystallized from acetone-commercial hexanes gave 2.5 g. of product having a melting point of 195–197° C. An analytical sample of 3β,17α-dihydroxy-6α-methyl-4-pregnen-20-one 17-acetate (II) had a melting point of 191–193° C., an $[\alpha]_D +30$ (CHCl$_3$) and the following analysis:

*Analysis.*—Calcd. for $C_{24}H_{34}O_4$: C, 74.19; H, 9.34. Found: C, 73.66; H, 9.32.

EXAMPLE 4

*3β,17α-dihydroxy-6-methyl-16-methylene-4,6-pregnadien-20-one 17-acetate (II)*

20.0 g. of 6-methyl-16-methylene-4,6-pregnadiene-3,20-dione 17-acetate was dissolved in 450 ml. of purified tetrahydrofuran and the solution was purged with nitrogen. The solution was cooled in an ice salt bath and 40 g. of lithium aluminum tri-t-butoxyhydride was slowly added thereto with stirring under nitrogen, following which the flask containing the reaction mixture was stoppered with a drying tube and cooled at −15° C. for about 60 hours. Dilute acetic acid was added dropwise whilst cooling in an ice salt bath until the inorganic material coagulated. The organic phase was decanted and the inorganic phase was swirled several times with a mixture of tetrahydrofuran and ether. The organic phases were combined, dried over magnesium sulfate, filtered and the solvent was removed therefrom. The crystalline residue was triturated with ether and recrystallized from a mixture of ether-commercial hexanes to yield 16.5 g. of 3β,17α - dihydroxy - 6 - methyl - 16 - methylene - 4,6-pregnadien-20-one 17-acetate having a melting point of 208–212° C. An analytical sample melted at 213–216° C., $[\alpha]_D -189°$ (CHCl$_3$), $\lambda_{max}^{alc.}$ 235 mμ $\epsilon = 22,150$, 243 mμ $\epsilon = 25,350$, 250 mμ $\epsilon = 16,050$ and had the following analysis:

*Analysis.*—Calcd. for $C_{25}H_{34}O_4$: C, 75.34; H, 8.60. Found: C, 75.19; H, 8.38.

EXAMPLE 5

*3β,17α-dihydroxy-6-methyl-16-methylene-4,6-pregnadien-20-one 3,17-diacetate*

A solution of 0.5 g. of 3β,17α-dihydroxy-6-methyl-16-methylene-4,6-pregnadien-20-one 17-acetate in 1 ml. of pyridine and 0.5 ml. of acetic anhydride was kept at room temperature for 24 hours. The product was precipitated by slow addition of water and recrystallized from acetone-Skellysolve B to give 0.45 g. of 3β,17α-dehydroxy-

15

6 - methyl - 16 - methylene - 4,6 - pregnadien - 20 - one 3,17-diacetate melting at 157–160° C., $\lambda_{max.}^{alc.}$ 234 m$\mu$ $\epsilon=29,150$, 241 m$\mu$ $\epsilon=26,850$, sh 249 m$\mu$ $\epsilon=17,400$

EXAMPLE 6

*3β,17α-dihydroxy-6-methyl-16-methylene-4,6-pregnadien-20-one 3-(β-cyclopentylpropionate) 17-acetate*

To a solution of 0.8 g. of 3β,17α-dihydroxy-6-methyl-16-methylene-4,6-pregnadien-20-one 17-acetate in 6 ml. of methylene chloride and 0.5 ml. of pyridine there was added 0.35 g. of β-cyclopentylpropionate chloride whilst cooling in an ice bath. After 1 hour water was added and the precipitated product extracted with ether, washed with water, dilute hydrochloric acid, dilute sodium bicarbonate, again with water and dried. The solvent was removed leaving a glassy residue which was taken up in methylene chloride and chromatographed over a Florisil column packed wet with commercial hexanes. The column was eluted using gradient technique using between 1% and 6% acetone in commercial hexanes. Those fractions which showed the absence of the 3β-hydroxy starting material were combined, filtered, and dried to give 0.8 g. of 3β,17α-dihydroxy-6-methyl-16-methylene-4,6-pregnadien-20-one 3-(β-cyclopentylpropionate) 17-acetate having $\lambda_{max.}^{alc.}$ 235 m$\mu$ $\epsilon=22,450$, 242 m$\mu$ $\epsilon=25,050$, sh 250 m$\mu$ $\epsilon=16,300$

EXAMPLE 7

*3β,17α-dihydroxy-6-methyl-4,6-pregnadien-20-one 17-acetate (II)*

5.0 g. of 6-methyl-4,6-pregnadiene-3,20-dione 17-acetate was dissolved in 120 ml. of purified tetrahydrofuran and the solution was purged with nitrogen. The solution was cooled in an ice salt bath and 10 g. of lithium aluminum tri-t-butoxyhydride was slowly added thereto with stirring, following which the flask containing the reaction mixture was stoppered with a drying tube and cooled at −15° C. for about 16 hours. Dilute acetic acid was added dropwise whilst cooling in an ice salt bath until the organic material coagulated. The organic phase was decanted and the inorganic phase was swirled several times with a mixture of tetrahydrofuran and ether. The organic phases were combined, dried over magnesium sulfate, filtered and the solvent was removed therefrom. The glassy residue which remained upon removal of the solvent was crystallized from a mixture of ethyl acetate-commercial hexanes. Sequential recrystallizations of this crystalline product (first recrystallization from a mixture of acetone-commercial hexanes, M.P. 194–204° C.; second recrystallization from acetone, M.P. 196–200° C.; third recrystallization from a mixture of acetone-commercial hexanes) yielded 3β,17α-dihydroxy-6-methyl-4,6-pregnadien-20-one 17-acetate having a melting point of 198–204° C., $[\alpha]_D$ −66° (CHCl$_3$), $\lambda_{max.}^{alc.}$ 235 m$\mu$ $\epsilon=21,750$, 243 m$\mu$ $\epsilon=24,950$, 250 m$\mu$ $\epsilon=16,000$

EXAMPLE 8

*3β,17α-dihydroxy-6-chloro-4,6-pregnadien-20-one 17-acetate*

To a solution of 2.0 g. of 6-chloro-17α-hydroxy-4,6-pregnadiene-3,20-dione 17-acetate in 45 ml. of tetrahydrofuran cooled in an ice salt bath there was added 4.0 g. of lithium aluminum tri-t-butoxyhydride. The solution was stored at −15° C. for 20 hours and a 5% acetic acid-95% water solution was added slowly until the excess hydride had decomposed. Saturated sodium chloride solution was added until the inorganic materials coagulated. The organic phase was decanted and the sludge washed with tetrahydrofuran and ether. The organic phases were combined and dried over magnesium sulfate, filtered and concentrated to dryness. The residue was recrystallized from acetone to give 1.75 g. of 3β,17α-dihydroxy - 6 - chloro - 4,6 - pregnadien - 20 - one 17-acetate melting at 227–229° C. and having ultraviolet absorption maxima at 235, 243 and 252 m$\mu$.

We claim:

1. A member selected from the group consisting of

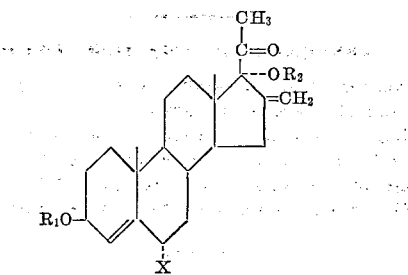

(1)

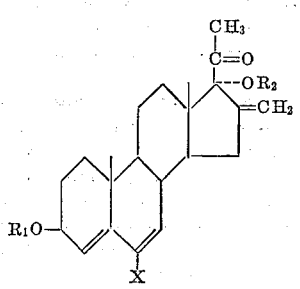

(2)

and

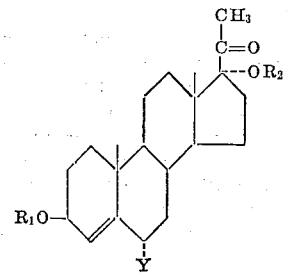

(3)

wherein X is selected from the group consisting of H and methyl; R$_1$ is selected from the group consisting of H and the acyl radical of a hydrocarbon monocarboxylic acid containing from 1 to 12 carbon atoms, inclusive; R$_2$ is the acyl radical of a hydrocarbon carboxylic acid containing from 1 to 12 carbon atoms, inclusive, and Y is a member of the group consisting of F, trifluoromethyl, difluoromethyl and fluoromethyl.

2. 3β,17α - dihydroxy - 6α - methyl - 16 - methylene-4-pregnen-20-one 17-acetate and the 3-acylates thereof in accordance with claim 1 wherein the acyl radical is that of a hydrocarbon monocarboxylic acid containing from 1 to 12 carbon atoms, inclusive.

3. 3β,17α - dihydroxy - 6 - methyl - 16 - methylene-4,6-pregnadien-20-one 17-acetate and the 3-acylates thereof in accordance with claim 1 wherein the acyl radical is that of a hydrocarbon monocarboxylic acid containing from 1 to 12 carbon atoms, inclusive.

4. 3β,17α - dihydroxy - 6 - methyl - 16 - methylene-4,6-pregnadien-20-one 17-acetate.

5. 3β,17α - dihydroxy - 6 - methyl - 16 - methylene-4,6-pregnadien-20-one 3,17-diacetate.

6. 3β,17α - dihydroxy - 6 - methyl - 16 - methylene-4,6-pregnadien-20-one 3-(β-cyclopentylpropionate) 17-acetate.

7. 3β,17α - dihydroxy - 6α - fluoro - 4 - pregnen - 20-one 17-acetate and the 3-acylates thereof in accordance with claim 1 wherein the acyl radical is that of a hydrocarbon monocarboxylic acid containing from 1 to 12 carbon atoms, inclusive.

8. 3β,17α - dihydroxy - 16 - methylene - 4 - pregnen-20-one 17-acetate and the 3-acylates thereof in accordance with claim 1 wherein the acyl radical is that of a hydrocarbon monocarboxylic acid containing from 1 to 12 carbon atoms, inclusive.

References Cited

UNITED STATES PATENTS

| 3,029,260 | 4/1962 | Mikina | 260—397.4 |
| 3,061,606 | 10/1962 | Gut et al. | 260—239.55 |
| 3,126,399 | 3/1964 | Sollman | 260—397.4 |

OTHER REFERENCES

Fajkos: "Collection Czech. Chem. Comm." (1959), vol. 24, p. 2284 relied on.

Ringold et al.: "J. A. C. S." (1959), vol. 81, pp. 3485–86 relied on. Copy in Scientific Library.

HENRY A. FRENCH, *Primary Examiner.*

UNITED STATES PATENT OFFICE
CERTIFICATE OF CORRECTION

Patent No. 3,408,370      Dated October 29, 1968

Inventor(s) John C. Babcock and J Allan Campbell

It is certified that error appears in the above-identified patent and that said Letters Patent are hereby corrected as shown below:

Column 1, line 40, patent reads " 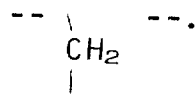 " should read $$-- \begin{array}{c} \backslash \\ CH_2 \\ | \end{array} --.$$

Column 2, line 5, patent reads:

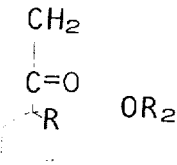

should read:

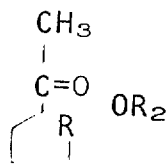

Column 4, line 27, patent reads "$C_{16}H_{40}O_6$" should read -- $C_{26}H_{40}O_6$ --.

Column 7, line 36, patent reads "and 17-acylate" should read -- 17-acylate --.

Column 11, line 55, patent reads "17-hydroxy" should read -- 17α-hydroxy --.

Column 13, line 6, patent reads "hexanoate" should read -- 3-hexanoate --.

SIGNED AND SEALED

JUN 2 1970

(SEAL)
Attest:

Edward M. Fletcher, Jr.
Attesting Officer

WILLIAM E. SCHUYLER, JR.
Commissioner of Patents